(12) United States Patent
Colell et al.

(10) Patent No.: US 11,738,494 B2
(45) Date of Patent: *Aug. 29, 2023

(54) METHOD FOR AUTOMATICALLY REGULATING THE SIZE OF A SLOT OF A NOZZLE ASSEMBLY AND CONTROL AND/OR REGULATION SYSTEM

(71) Applicant: Windmöller & Hölscher KG, Lengerich (DE)

(72) Inventors: Waldemar Colell, Lengerich (DE); Bernd-Alexander Groepper, Lengerich (DE); Torsten Schmitz, Lengerich (DE); Daniel Faustmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 100 days.

This patent is subject to a terminal disclaimer.

(21) Appl. No.: 17/055,371

(22) PCT Filed: May 15, 2019

(86) PCT No.: PCT/EP2019/062434
§ 371 (c)(1),
(2) Date: Nov. 13, 2020

(87) PCT Pub. No.: WO2019/219729
PCT Pub. Date: Nov. 21, 2019

(65) Prior Publication Data
US 2021/0213666 A1    Jul. 15, 2021

(30) Foreign Application Priority Data
May 16, 2018 (DE) ............... 10 2018 111 765.5

(51) Int. Cl.
*B29C 48/31* (2019.01)
*B05B 1/32* (2006.01)
(Continued)

(52) U.S. Cl.
CPC .............. *B29C 48/313* (2019.02); *B05B 1/02* (2013.01); *B05B 1/32* (2013.01); *B29C 48/08* (2019.02);
(Continued)

(58) Field of Classification Search
None
See application file for complete search history.

(56) References Cited

U.S. PATENT DOCUMENTS 3,940,221 A    2/1976 Nissel
4,753,587 A    6/1988 Djordjevic et al.
(Continued)

FOREIGN PATENT DOCUMENTS

CN    101365571 A    2/2009
CN    104552869 A    4/2015
(Continued)

OTHER PUBLICATIONS

Communication from the European Patent Office dated Aug. 2, 2021, indicating the Third Party Observations filed for European Application No. 19725088.9 dated Jul. 27, 2021, 15 pages.
(Continued)

*Primary Examiner* — Robert J Grun
(74) *Attorney, Agent, or Firm* — Rudy J. Ng; Bret E. Field; Bozicevic, Field & Francis LLP (57) ABSTRACT

The invention relates to a method for automatically regulating the size of a nozzle discharge slot of a nozzle assembly, wherein the nozzle assembly comprises a first and a second nozzle lip and a nozzle discharge slot arranged between the nozzle lips for setting in a controlled manner a
(Continued)

thickness profile of a conveyable melt. A plurality of adjusting elements, in particular a plurality of adjusting pins, which are coupled to a respective thermoelement, is arranged at the first nozzle lip, wherein the thermoelements are controllable by the regulation in such a way that the slot adjustment can be realized by the action of a mechanical force from the respective adjusting element on the first nozzle lip as a result of an expansion or contraction of the thermoelements. An adjustment of the adjusting elements is carried out automatically based on measurement signals of at least one sensor, wherein the sensor is designed and/or arranged at the nozzle assembly in such a way that conclusions can be drawn about the thickness profile of the melt. The right-hand and left-hand edge region of the melt is monitored by means of the sensor and is controlled or regulated in such a way that the respective edge region is set by adjusting the adjusting elements depending on the material, in particular viscosity and/or viscoelasticity, and/or quality criteria and/or a conveying speed. The invention further relates to a control and/or regulation system.

13 Claims, 4 Drawing Sheets (51) Int. Cl.
    *B05B 1/02*        (2006.01)
    *B29C 48/08*      (2019.01)
    *B29C 48/92*      (2019.01)
    *B29L 7/00*        (2006.01)

(52) U.S. Cl.
    CPC .... *B29C 48/92* (2019.02); *B29C 2948/92152* (2019.02); *B29C 2948/92447* (2019.02); *B29C 2948/92647* (2019.02); *B29C 2948/92904* (2019.02); *B29L 2007/008* (2013.01)

(56) References Cited

U.S. PATENT DOCUMENTS

| | | |
|---|---|---|
| 4,804,557 A | 2/1989 | Anthony, Jr. et al. |
| 6,799,961 B1 | 10/2004 | Freynhofer et al. |
| 2021/0213665 A1* | 7/2021 | Colell ........................ B05B 1/32 |
| 2021/0213668 A1* | 7/2021 | Schmitz ................. B29C 48/31 |
| 2021/0237327 A1* | 8/2021 | Colell ..................... B29C 48/31 |

FOREIGN PATENT DOCUMENTS

| | | |
|---|---|---|
| DE | 19855751 A1 | 6/2000 |
| DE | 10117946 A1 | 10/2002 |
| EP | 257233 A2 | 3/1988 |
| EP | 1964659 A1 | 9/2008 |
| EP | 2837484 A1 | 2/2015 |
| EP | 2865511 A1 | 4/2015 |

OTHER PUBLICATIONS

Affidavit in support of third party observations before the European Patent Office submitted by Ricky Keller dated Jul. 15, 2021, 43 pages.
Egan Davis-Standard Instruction Manual for Egan Series 50A Coating Die, Internally Deckled, Feb. 1999, 35 pages.
Bezigian, A Survey of Current Bead Reduction Die Technology, PLC Technologies Consulting Co., May 14, 1997, 12 pages.
Operation Manual for the Black Clawson R.O.I. Die, Black Clawson Converting Machinery Corp., Jan. 16, 1998, 36 pages.
Vlachopoulos et al., Chapter 4: Flat Film and Sheet Dies, in: Design of Extrusion Forming Tools, pp. 113-140, Carneiro O.S. and Nobrega M. (eds.), Smithers Rapra, London, UK.
Office Action for European Application No. 19725088.9 dated Nov. 19, 2021, with its English translation, 8 pages.
International Preliminary Report on Patentability for PCT Application No. PCT/EP2019/062434 dated Aug. 28, 2020, 8 pages.
Written Opinion for PCT Application No. PCT/EP2019/062434 dated May 7, 2020, with its English summary, 9 pages.
First Office Action for Chinese Application No. 201980045521.X dated Jun. 1, 2022, with its English summary, 7 pages.
Office Action for European Application No. 19725088.9 dated Jun. 22, 2022, with its English summary, 7 pages.
Office Action for European Application No. 19725088.9 dated May 3, 2023, with its English Translation, 14 pages.
Decision to Grant for Chinese Application No. 201980045521.X dated Apr. 5, 2023, with its English Translation, 5 pages.

\* cited by examiner

METHOD FOR AUTOMATICALLY REGULATING THE SIZE OF A SLOT OF A NOZZLE ASSEMBLY AND CONTROL AND/OR REGULATION SYSTEM

The present invention relates to a method for automatically regulating the size of a nozzle discharge slot of a nozzle assembly. The invention further relates to a control and/or regulation system.

In flat film applications, such as the production of films or bands of thermoplastic plastics, automatic nozzles are used in the prior art to form an extruded plastic melt into a thin rectangular surface or film. The automatic nozzles comprise a first and a second nozzle lip as well as a nozzle discharge slot arranged between the nozzle lips for setting in a controlled manner a thickness profile of the conveyable melt. On the first nozzle lip a plurality of adjusting elements is arranged, which are each coupled to a thermoelement. When heated, the thermoelements expand and exert mechanical pressure on the nozzle lip via the associated adjusting element, causing the nozzle lip to deform at the corresponding location. In particular, this reduces the nozzle discharge slot. Furthermore, the thermoelements can compress during cooling and cause a mechanical pull on the nozzle lip via the adjusting elements, which increases the nozzle discharge slot at the corresponding location. The thermoelements can be controlled by a nozzle regulation in such a way that the slot can be adjusted by the action of a mechanical force applied to the first nozzle lip by the respective adjusting element as a result of the expansion or contraction of the thermoelements.

It is important that the controlled thickness profile of the melt can be achieved by setting or adjusting the nozzle discharge slot. The thickness profile is especially important for subsequent processes such as winding of film webs for storage or further processing of the film into bags. For monitoring the thickness profile, thickness gauges, in particular by means of ultrasonic or infrared measurements, are known to be used in such a way that cross profile deviations in a net region of the film or melt are continuously minimized in order to avoid so-called piston rings on the film roll. In other words, deviations from a nominal profile of the film are continuously determined by means of a thickness measurement, and a control value for the individual thermoelements or adjusting elements at the nozzle lip is then generated, so that the nozzle discharge slot is locally increased or reduced for a uniform thickness. As a measurable and indicated quality criterion of a flat film produced by means of a nozzle regulation, a statistical 2- or 3-sigma deviation of the measured film thickness from an average value or a nominal value is usually specified.

A prerequisite for the function of nozzle regulations is a precise, manual setting of a homogeneous nozzle discharge slot adapted to the product to be produced. Consequently, before the initial operation and, if necessary, during the nozzle regulation, an additional setting of individual adjusting elements of the nozzle assembly must be carried out by the operator in such a way that a stable process is achieved.

The process of setting the nozzle discharge slot is often carried out manually during a production interruption by manually closing or opening individual adjusting elements by the operator. This adjustment of individual adjusting elements can be very time-consuming.

Due to the mutual, in particular asymmetrical influence of the adjusting elements in relation to the bending curve of the nozzle lip (transverse influence), a disadvantageous profile tolerance with a 2-sigma deviation of the thickness profile of more than 20-40% can occur even after manual centering of the nozzle discharge slot. The manual centering of the nozzle discharge slot is largely dependent on the professional experience of the operator. Furthermore, manual centering is time-consuming and sometimes not completely reproducible and the individual adjusting elements have to be set or adjusted repeatedly one after the other during production with every further initial operation or with every further deviation from the nominal value of the thickness profile.

Furthermore, the film edge in flat film extrusion is disadvantageously characterized by the so-called edge entry ("neck-in"), which is caused by the withdrawal of the melt from the nozzle assembly and the visco-elastic behavior of the melt. As a result of the neck-in, a reduction of the film width in relation to the width of the nozzle discharge slot occurs, as well as a thickening of the edge region of the film corresponding to this reduction, which is usually removed by an edge trim before winding and represents the net region of the film. In the prior art, the known nozzle regulations are significantly limited to the net region of the film. Due to the edge trim, however, high material losses can occur.

It is possible to feed the edge trim directly back to an extruder to provide the melt. However, it has been shown that the edge trims that are fed back can vary significantly in the edge region due to the resulting edge thickness when the adjusting elements are adjusted in the edge region with a common practice, and this can even lead to an unstable conveying behavior. If such instability occurs, this results in throughput fluctuations and, as a consequence, in a disadvantageous effect on the desired thickness profile of the melt.

It is therefore an object of the present invention to at least partially eliminate the disadvantages described above. In particular, it is an object of the present invention to provide a setting of the nozzle discharge slot in the edge region of the film with an improved precision, thus enabling a targeted setting of the edge region.

The previous object is solved by a method with the features of claim 1. Furthermore, the object is solved by a control and/or regulation system with the features of claim 13. Further features and details of the invention result from the dependent claims, the description and the figures. Features and details which are described in relation to the method according to the invention are of course also valid in relation to the control and/or regulation system according to the invention and vice versa, so that with regard to the disclosure of the individual aspects of the invention reference is or can always be made to each other.

In the context of the application, the term of the regulation preferably comprises control and/or regulation methods and/or machine learning methods, to which a measured variable can be fed as an input signal into the regulation with regard to the thickness profile and/or the characteristic properties of the melt and, based on this, a setting or adjustment of individual or all adjusting elements or thermoelements can be carried out. The adjustment is carried out by means of a control value or control signal generated by the regulation for the individual adjusting elements or the respective thermoelements.

Furthermore, in the context of the application, the term "pinning" comprises in particular the adhesion or fixing of the melt to a casting roll. Adhesion can preferably be effected electrostatically or pneumatically.

In the context of the application, adjusting elements are defined as elements for local adjustment of the nozzle discharge slot, such as thermal expansion pins, step/servo motors or piezo actuators. Furthermore, piezomechanical adjusting elements or adjusting elements operated by electrochemical volume changes are generally conceivable.

According to a first aspect of the invention, the object is solved by a method for automatically regulating the size of a nozzle discharge slot of a nozzle assembly, wherein the nozzle assembly comprises a first and a second nozzle lip and a nozzle discharge slot arranged between the nozzle lips for setting in a controlled manner a thickness profile of a conveyable melt. A plurality of adjusting elements, in particular a plurality of adjusting pins, which are coupled to a respective thermoelement, is arranged at the first nozzle lip, wherein the thermoelements are controllable by the regulation in such a way that the slot adjustment can be realized by the action of a mechanical force from the respective adjusting element on the first nozzle lip as a result of an expansion or contraction of the thermoelements. An adjustment of the adjusting elements is carried out automatically based on measurement signals of at least one sensor, wherein the sensor is designed and/or arranged at the nozzle assembly in such a way that conclusions can be drawn about the thickness profile of the melt. The right-hand and left-hand edge region of the melt is monitored by means of the sensor and is controlled or regulated in such a way that the respective edge region is set by adjusting the adjusting elements depending on the material, in particular viscosity and/or viscoelasticity, and/or quality criteria and/or a conveying speed.

The invention has the advantage that the edge region of the melt or film which is outside the net region is explicitly considered and evaluated. By monitoring the edge region of the melt, the entire thickness profile can be optimally set. Therefore, the entire width of the nozzle discharge slot can be used advantageously. The edge region can be evaluated with regard to quality and/or stability criteria, in particular depending on the product to be produced and/or the production process. Furthermore, it is advantageous that by monitoring the edge region and the corresponding adjustment of the adjusting elements, the edge region can be set in such a way that an edge trim can be reduced. The material of the melt can therefore be optimally utilized.

The at least one sensor is preferably connected to the regulation by data communication for the transmission of measurement signals. For example, the sensor can be designed as a temperature sensor, an infrared or ultrasonic sensor or as an optical sensor. As an example, the sensor can be designed as a camera for optical image acquisition of the melt, in particular of the edge region. The sensor can preferably be arranged at a casting roll to measure the temperature of the melt emerging from the nozzle discharge slot and conveyed at the casting roll. Furthermore, the sensor can measure the flow behavior of the melt, in particular at the edge. In particular, several sensors can be provided for the precision measurement of the entire thickness profile and in particular the edge region and/or differently designed sensors can be combined. By comparing the measured thickness profile with a nominal value, a basic control value can be generated by the regulation for the individual adjusting elements so that a deviation from the nominal value is a maximum of 30%, in particular a maximum of 10%, preferably in the range of 2% to 5%. Furthermore, the regulation also comprises a data processing unit, which is configured in such a way that the measurement signals of the sensor are processed and, based on this, a control signal or control value is generated for the adjusting elements or the respective thermoelements for adjusting the slot of the nozzle discharge slot. In other words, the processing of the measurement signals of the sensor results in the control or regulation of single, several or all adjusting elements of the nozzle assembly. As a result, a melt flow distribution optimized for process stability and product quality and the resulting shaping of the edge of the melt plume and/or film is achieved.

The invention further has the advantage that the design of the melt flow distribution at the nozzle discharge slot, in particular in the edge region (and consequently the stability resulting there) can be exemplarily designed depending on an operating point (e.g. an output or a temperature of the melt) and a recipe (e.g. viscosity or viscoelasticity). For example, in the case of high output and/or high melt viscosity, the nozzle discharge slot can be bent up further in a central region. This in turn can result in a reduced melt flow in the edge regions. The nozzle regulation can advantageously compensate for this and carry out appropriate settings of adjusting elements so that the film edge meets the defined stability criteria. Furthermore, in the case of a very thin film, it can be advantageous to create a stable, thicker edge region to ensure process stability even at high line speeds. With a thick film, on the other hand, it is advantageous to set the film edge to be correspondingly thinner due to its slower cooling for achieving high speeds. By means of the nozzle regulation and the setting of the edge regions, the design of the film edges is therefore known, reproducible and, in particular, symmetrical. Correspondingly, the regulation enables high process stability and product quality.

It is preferable that individual adjusting elements are adjusted with a time delay. This has the advantage that a product-specific and characteristic formation of the melt plume can be achieved.

In a preferred embodiment it may be provided that the adjusting elements, in particular all adjusting elements, are adjusted simultaneously. The simultaneous, in particular automatic, adjustment of the adjusting elements can eliminate for a time-consuming manual adjustment of individual adjusting elements one after the other by saving a large number of iterations by the operator. Thus, the entire production process can be significantly accelerated. Likewise, the simultaneous adjustment of the adjusting elements, in particular of all adjusting elements, can reduce the transverse influence of the adjusting elements. A further special advantage compared to a selective and mostly manual adjustment of the adjusting elements by the operator is the symmetry of the edges of the melt or the film edges which can be achieved by a simultaneous adjustment. This symmetry of the neck-in behavior in turn enables higher process stability and product quality, in particular with regard to consistency along the entire film width.

Within the scope of the invention, it is further conceivable that the adjusting elements, in particular all adjusting elements, are adjusted over an equal stroke, thus enabling a parallel adjustment. In particular, all adjusting elements can preferably be adjusted symmetrically, wherein a standardized nozzle discharge slot of the nozzle assembly can be set. Due to the standardized nozzle discharge slot, a high reproducibility is given, which enables the continuous product quality at each further initial operation. The setting of the standardized nozzle discharge slot can be exemplarily made depending on the melt or the material of the product to be produced. The setting or adjustment of the adjusting elements can be done by means of a standardized setting of the torque of the adjusting elements, wherein the adjusting elements comprise an equal or essentially equal contact pressure against the first nozzle lip.

In a preferred embodiment, it is provided that, in particular when a regulation limit is reached, a simultaneous adjustment of individual or several adjusting elements occurs. The regulation limit can represent a maximum or minimum opening of the nozzle discharge slot. It is therefore advantageous to react as quickly as possible to an excessive opening or closing of the nozzle discharge slot by adjusting the adjusting elements.

It is preferably conceivable that by means of electrostatics and/or air an edge adhesion of the melt emerging from the nozzle assembly to a casting roll occurs, wherein the edge adhesion, in particular the strength of the edge adhesion and/or the position on the casting roll, is set by means of the regulation depending on the material and/or quality criteria and/or the conveying speed. The edge adhesion describes an adhesion of the melt emerging from the nozzle discharge slot to the casting roll, for example via electrostatics ("electro-static pinning") and/or via air ("air pinning"). In particular, electrostatic pinning between an edge thickening and the net region of the film can lead to a thin section, as the electrostatic attracts melt particles from both sides. The characteristics of the thin section depends, for example, on the melt flow distribution at the nozzle discharge slot, on the viscoelastic behavior of the melt and on process settings such as the line speed, the length of the melt plume, the strength of the pinning as well as other feeding devices such as a vacuum box or an air knife. By setting the edge adhesion or pinning, the reproducibility of the melt flow distribution at the nozzle discharge, in particular in the edge regions of the nozzle, and/or the production of a symmetry of the same can be achieved. A particular advantage of the nozzle regulation is the reproducible design of the film edge, which in contrast to the prior art, allows a much easier and also reproducible setting of the pinning. The nozzle regulation can also comprise setting hints or specifications for the positioning and strength of the pinning.

A further advantage is that the edge adhesion is continuously monitored and/or detected during the operation of the nozzle assembly. This has the advantage that the result of the setting of the pinning is reproducibly detected and can be optimized according to intended quality criteria.

Alternatively or additionally, it may be provided that the edge adhesion is detected by means of a multidimensional motorized traversing and/or an optical system and/or a temperature detection of the melt on the casting roll and/or sensors to determine the thickness profile of the melt. The detection of the pinning position or the position of the edge adhesion can be done by means of a 1-, 2- or 3-dimensional (motorized) traversing or by optical systems. The detection of the pinning result (e.g. the shape of the edge region) can be done by temperature detection of the melt on the casting roll and/or by conventional thickness measurement systems, which measure the entire film width and provide as precise information as possible about the shape of the edge. Furthermore, the pinning result (shape of the edge region) can be detected by means of a traversing sensor, in particular an infrared sensor or an FPM sensor, below a point of impact on the casting roll and/or by means of conventional thickness measurement systems. Suitable quality criteria for the stability of the edge are, for example, the position of the thin section, the ratio of thin to thick sections, the form and/or shape of the thin and thick sections, the detected temperature profile in the edge region and the detected profile of the film thickness in the edge region. In addition to the control values for regulating the adjusting elements, the nozzle regulation can also generate the necessary information for setting and/or controlling and/or regulating electrostatic and pneumatic pinning. This contributes significantly to the already described increase in process stability.

Within the scope of the invention it is further conceivable that the specific setting of the adjusting elements depending on the material, in particular the viscosity and/or viscoelasticity, and/or quality criteria and/or the conveying speed is stored and/or integrated as a self-learning algorithm for a renewed initial operation of the nozzle assembly. This has the advantage that a targeted initial operation with pre-stored settings is possible for a renewed film production, which further increases the reproducibility of the setting of the nozzle discharge slot. In particular, the setting free from play can be stored as a recipe value and/or automatically regulated with respect to specific predefined criteria and/or implemented as a self-learning algorithm.

Preferably, it may be provided that, at an initial operation of the nozzle assembly for conveying the melt, the adjusting elements for subsequent regulation of the slot size are set uniquely free from play as the initial setting. This has the advantage that the setting of the adjusting elements free from play allows an exact alignment of the nozzle discharge slot. If there is too much play in the adjusting elements, the heating or cooling of the thermoelements can sometimes not lead to a deformation of the nozzle lip, but the change in length of the thermoelements is partially lost without effect in the play of the nozzle assembly. Furthermore, the setting of the adjusting elements free from play at the initial operation of the nozzle assembly allows a reproducible starting point for the nozzle regulation. This generally increases the process stability, for example to advantageously increase the line speed when conveying the melt through the nozzle assembly, or to significantly increase the efficiency of a flat film facility. The reproducible setting free from play also allows for increased quality consistency for different products, resulting in improved results for both new machine and retrofit business. In particular, the setting free from play at the initial operation of the nozzle assembly can be carried out automatically, thus avoiding any manual intervention by an operator. Thus, a high reproducibility in the basic setting of the nozzle assembly and/or during production can be ensured. This also generally simplifies the machine setup and significantly shortens the setup time of the nozzle assembly before production. It also reduces the need for further manual settings by the operator during production to regulate the thickness profile.

Preferably, it may be provided that at least two adjusting elements are adjusted simultaneously. This has the advantage that the simultaneous, in particular automatic, adjustment of at least two adjusting elements can eliminate the need for a time-consuming manual adjustment of individual adjusting elements one after the other by saving a large number of iterations by the operator. Thus, the entire production process can be significantly accelerated. In the same way, the simultaneous adjustment of two adjusting elements, in particular of two adjacent adjusting elements, can reduce the transverse influence of the adjusting elements.

Furthermore, it can be advantageously provided that at least one clamping blade is respectively arranged in a right-hand and left-hand edge region of the nozzle assembly, wherein the width of the nozzle discharge slot can be variably set, wherein the method for adjusting the width of the nozzle discharge slot and for clamping the adjusting elements can be carried out automatically and comprises the following steps:

unclamping the clamping blade within the nozzle discharge slot;

displacing the clamping blade within the nozzle discharge slot;

clamping the clamping blade within the nozzle discharge slot for fixing individual adjusting elements.

This has the advantage that the automatic setting of the clamping blades for a width adjustment of the nozzle discharge slot results in significant time savings in the production process, as no manual adjustment by the operator is required. In addition, the nozzle regulation provides the basis for another customer benefit, namely fully automatic width adjustment in a flat film facility. Therefore, a very flexible format of the flat film can be realized. The process of automating the adjustment of the clamping blades can achieve larger sales volumes and relieve the operator of the nozzle assembly in physical and psychological terms. Furthermore, the precision of the adjustment of the clamping blades can be increased by the automation.

Preferably, a standardized nozzle discharge slot of the nozzle assembly is set by means of the setting of the adjusting elements free from play. For this purpose, the adjusting elements can be adjusted symmetrically. The standardized nozzle discharge slot ensures a high degree of reproducibility, which enables continuous product quality at each subsequent initial operation. The setting of the standardized nozzle discharge slot can be exemplarily carried out depending on the melt or the material of the product to be produced. Furthermore, the standardized setting allows the reduced set-up time of the nozzle assembly for the production.

In a preferred embodiment, it may be provided that the degree of freedom from play of the adjusting elements is set depending on the type of melt and/or depending on the size of a basic slot of the nozzle assembly. In particular, the material of the melt, the operating temperature or melt temperature or the recipe of the melt, in particular its viscosity and/or viscoelasticity, can be taken into account. Furthermore, the degree of freedom from play can be set preferably with regard to quality and/or stability criteria of the melt and/or the production process, such as the line speed and/or the length of the melt plume.

Within the scope of the invention, it is further conceivable that the setting of the adjusting elements free from play is achieved by means of a standardized setting of the torque of the adjusting element, wherein the adjusting elements comprise an equal or substantially equal contact pressure against the first nozzle lip. In particular, the standardized setting of the torque of the adjusting elements can be carried out with 2 Nm. This has the advantage that no manual setting of a mechanical nozzle discharge slot adapted to the product to be produced is necessary for the regulation. The adjusting elements of the nozzle assembly are only set uniquely at the initial operation or re-operation of the nozzle assembly in such a way that all adjusting elements cause an essentially equal low pressure on the nozzle lip. In other words, the adjusting elements cause an equal slight deformation of the nozzle lip or a slight increase or decrease of the nozzle discharge slot.

In a preferred embodiment it is provided that the adjusting elements are set as an initial setting to a maximum opening stroke of the nozzle assembly. This has the advantage that a specific centering of the nozzle discharge slot can be omitted if the maximum opening stroke of the nozzle assembly is used as a starting point for the regulation. This enables time savings in the production. Furthermore, it is not necessary to set individual adjusting elements by the operator to achieve the uniform film thickness distribution required for the initial operation of the nozzle regulation to a 2-sigma tolerance of, for example, 10%. The inventive nozzle regulation can also achieve a regulated tolerance of approx. 10% during production, starting from an unregulated tolerance of more than 20% at the initial operation, in particular more than 30% or in particular more than 40%. In particular, it is advantageously possible to enable a reproducible operation and production of the nozzle assembly, since with the help of the nozzle regulation, the adjustment or setting of all adjusting elements is known at any time.

Preferably, it may be provided that the setting of the adjusting elements free from play is stored and/or integrated as a self-learning algorithm for a renewed initial operation of the nozzle assembly. This has the advantage that a specific initial operation with pre-stored settings is possible for a renewed film production, which further increases the reproducibility of the setting of the nozzle discharge slot. In particular, the setting free from play can be stored as a recipe value and/or automatically regulated with respect to specific predefined criteria and/or implemented as a self-learning algorithm.

In a further preferred embodiment of the invention, it is conceivable that subsequent to the initial setting, the adjusting elements are automatically regulated along the entire width of the nozzle assembly for the slot adjustment, in particular in an edge region of the nozzle assembly. After the unique setting of the nozzle assembly according to the above described embodiments, the setting of the nozzle discharge slot suitable for the product is carried out by means of the automatic nozzle regulation. It is advantageous that the regulation is carried out along the entire width of the nozzle discharge slot. Since the adjusting elements are thus also set in the right-hand and left-hand edge region of the nozzle discharge slot, it is not necessary for the operator to iteratively create a stable film edge during production by manually adjusting them. The regulation can comprise a targeted influence on the melt flow distribution during the initial operation and in the production, in particular in the edge region of the nozzle assembly, so that a stable edge of the melt is achieved here without user intervention. In other words, the thickness profile is also regulated outside the net region of the film.

Within the scope of the invention, it is further conceivable that the adjusting elements are adjusted depending on the type of melt and/or depending on the size of a basic slot of the nozzle assembly. In particular, the material of the melt, the operating temperature or melt temperature or the recipe of the melt, in particular its viscosity and/or viscoelasticity, can be taken into account. This has the advantage that a setting of the nozzle discharge slot can be determined very precisely for the specific material. Furthermore, the setting can preferably be made with regard to quality and/or stability criteria of the melt and/or the production process, such as the line speed and/or the length of the melt plume.

Preferably, it may be intended that the unclamping and/or clamping of the clamping blade occurs thermally. In particular, the unclamping and/or clamping of the clamping blade can be carried out by means of a corresponding thermoelement, which is coupled with the clamping blade. The thermoelements expand when heated and thereby exert a mechanical pressure on the corresponding clamping blade. As an example, the thermoelements can be controlled by the regulation in such a way that the clamping blade is unclamped and/or clamped by an expansion or contraction of the thermoelements. By means of the thermal unclamping and/or clamping a well controllable fine adjustment can be realized. This enables an exact positioning and/or contact pressure alignment of the clamping blades and therefore guarantees a qualitatively improved and at the same time automated setting of the clamping blades.

In a preferred embodiment it may be provided that when the clamping blade is displaced to reduce the nozzle discharge slot, a specific, in particular pre-stored, setting of the adjusting elements, in particular in an edge region, is transferred to the reduced nozzle discharge slot accordingly. This has the advantage that a targeted initial operation with pre-stored settings is enabled during a renewed film production, which further increases the reproducibility of the setting of the nozzle discharge slot. In particular, the setting of the adjusting elements can be stored as a recipe value and/or automatically regulated with respect to specific pre-defined criteria. By transferring the setting of the adjusting elements during a format adjustment of the width of the nozzle discharge slot, an optimal adaptation to the new width can be achieved. In addition, the transfer of the settings scaled to the width of the nozzle discharge slot results in further time savings in the production.

Within the scope of the invention, it is further conceivable that prior to displacing the clamping blade, an examination of the necessity of adjusting the specific, in particular pre-stored, setting of the adjusting elements, in particular in an edge region, is carried out. The examination can occur in particular depending on the melt or the material of the product to be produced. In particular, the material of the melt, the operating temperature or melt temperature or the recipe of the melt, in particular its viscosity and/or viscoelasticity, can be taken into account. Furthermore, the examination can preferably be set with regard to quality and/or stability criteria of the melt and/or the process, such as the line speed and/or the length of the melt plume. Advantageously, specific edge settings can be transferred to the new edge section inwards and an automatic format adjustment of the nozzle discharge slot can be performed.

Alternatively or additionally, it is conceivable that, when the clamping blade is displaced to reduce the nozzle discharge slot, a specific, in particular pre-stored, setting of an edge adhesion of the melt emerging from the nozzle assembly on a casting roll is transferred to the reduced nozzle discharge slot accordingly by means of electrostatics and/or air. By transferring the setting for the edge adhesion in the case of a format adjustment of the width of the nozzle discharge slot, an optimal adaptation to the new width can be further improved.

Preferably, it may be provided that, when the clamping blade is displaced and clamped to reduce the nozzle discharge slot, the fixed adjusting elements are excluded from the regulation. In a preferred embodiment, it may be provided that the fixed adjusting elements are set to an exact nominal value by the regulation. This has the advantage that the nominal value can be set to a defined value for the adjusting elements fixed by the clamping blade, in particular a maximum or minimum opening stroke, so that the fixed adjusting elements do not change their position. This ensures a tightness of the nozzle assembly, since the fixed adjusting elements preferably do not allow melt to pass through the nozzle discharge slot. This ensures that no melt escapes outside the intended edge region of the nozzle discharge slot.

In a preferred embodiment, it may be provided that the regulation of the adjusting elements for setting the nozzle discharge width is based on stored and/or historical profiles. This has the advantage that, in case of a new film production, a targeted initial operation and production with pre-stored settings is possible, which further increases the reproducibility of the setting of the nozzle discharge slot. It is also advantageous to derive quantitative and/or qualitative learning steps from the history for the setting of the nozzle discharge width.

Advantageously, it is conceivable that the displacement of the clamping blade is limited to a maximum adjustment torque. This provides, for example, protection against damage and/or an incorrect setting of the clamping blade. The limitation of the displacement of the clamping blade can be selected depending on the material, in particular viscosity and/or viscoelasticity, and/or quality criteria and/or the conveying speed for the nozzle assembly. Thus, an optimal setting for the production process can occur.

Alternatively or additionally, it is conceivable that the displacement of the clamping blade is motorized. Therefore, no manual intervention of the operator is required. Furthermore, the motorized displacement of the clamping blade is in particular useful for the full automation of the nozzle assembly.

According to a further aspect of the invention, a control and/or regulation system with a control unit is provided for carrying out the method according to one of the preceding embodiments. Features and details described in connection with the method according to the invention are of course also valid in connection with the control and/or regulation system according to the invention and vice versa, so that with respect to the disclosure of the individual aspects of the invention, reference is or can always be made to each other.

The invention is explained in more detail below on the basis of non-restrictive embodiment examples, which are shown in the figures. The figures show.

In the following figures, similar elements are marked with the same reference signs for reasons of clarity.

Figure 1:
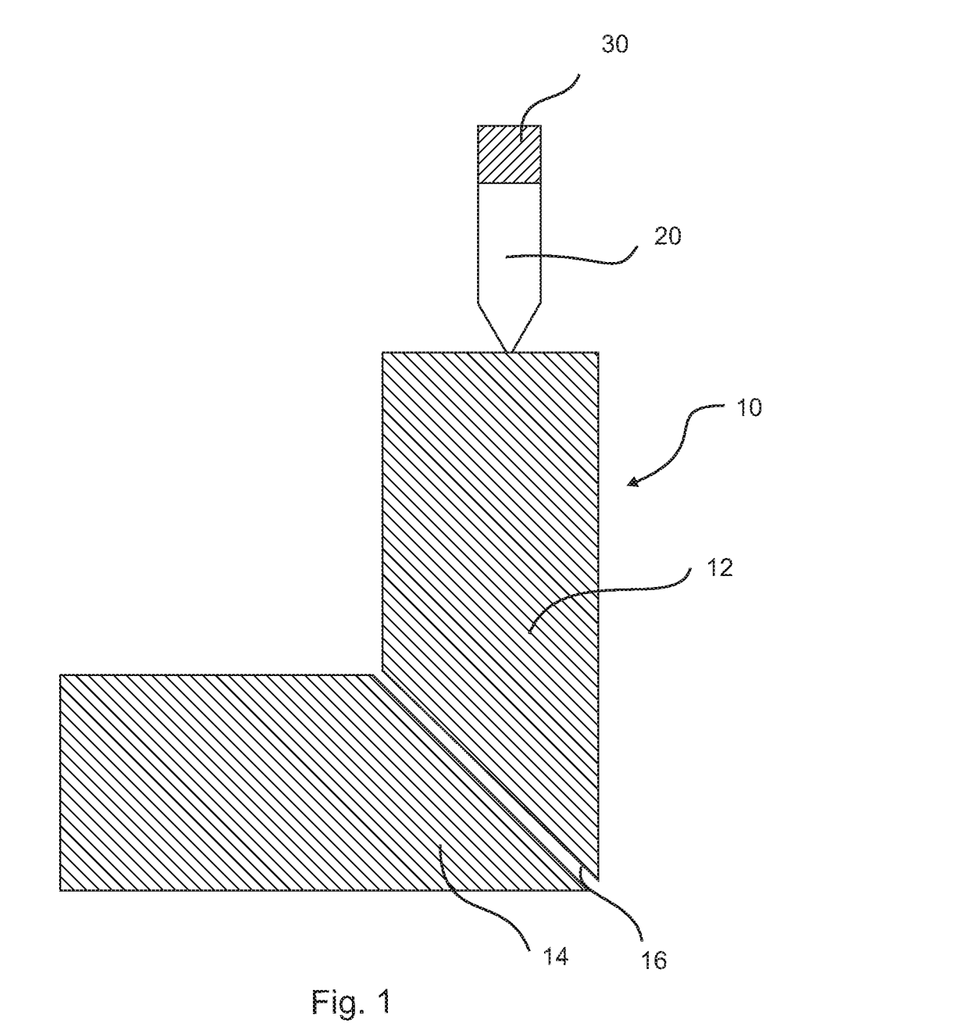
FIG. 1 a schematic view of an inventive nozzle assembly according to a first embodiment.

FIG. 1 shows a schematic view of a nozzle assembly 10 according to the invention for an automated regulation of the size of a nozzle discharge slot according to a first exemplary embodiment. The nozzle assembly 10 comprises a first nozzle lip 12 and a second nozzle lip 14. A nozzle discharge slot 16 is arranged between the nozzle lips 12, 14 for the controlled setting of a thickness profile of a conveyable melt. The melt, for example a plastic melt for the production of a flat film, is conveyed through the nozzle discharge slot 16, Depending on the size or height of the nozzle discharge slot 16, the thickness of the melt is set or changed.

To set the size or height of the nozzle discharge slot 16, a plurality of adjusting elements 20, in particular approx. 120 adjusting elements 20, is arranged on the first nozzle lip 12. Only one adjusting element 20 is shown symbolically in FIG. 1.

The adjusting element 20 is exemplarily designed as an adjusting pin, which comprises a tapering shape in the direction of the first nozzle lip 12. The tapered shape tapers to a point-shaped tip. The point-shaped tip forms a minimum contact surface between the adjusting element 20 and the first nozzle lip 12. In other words, the adjusting element 20 is connected to the first nozzle lip 12 via the point-shaped tip.

The adjusting element 20 is coupled with a respective thermoelement 30. When heated, the thermoelement 30 expands and exerts a mechanical pressure on the first nozzle lip 12 via the respective adjusting element 20, causing it to deform at the corresponding location. In particular, the nozzle discharge slot 16 is thus reduced. Furthermore, the thermoelement 30 can compress during cooling and causes a mechanical pull on the first nozzle lip 12 via the adjusting element 20, which increases the nozzle discharge slot 16 at the corresponding location. For this purpose, the thermoelement 30 can be controlled by a nozzle regulation in such a way that that the slot can be adjusted by the action of a mechanical force from the adjusting element 20 on the first nozzle lip 12, as a result of the expansion or contraction of the thermoelement 30. In other words, the thermoelement 30 can exert pressure on the first nozzle lip 12 by means of an exemplary expansion via the adjusting element 20. The design of the adjusting element 20 with its tapered shape leads in particular to a very precise adjustment of the nozzle discharge slot 16, since the effect on adjacent adjusting elements is reduced. The nozzle discharge slot 16 is therefore deformed in a limited spatial region of the first nozzle lip 12. The thermoelement 30 can, for example, be connected to a heating or cooling device, which is controlled by the regulation for heating or cooling the thermoelement 30.

Furthermore, an adjustment of the adjusting elements 20 can be carried out automatically based on measurement signals of a non-displayed sensor, wherein the sensor is designed and/or arranged at the nozzle assembly 10 in such a way that conclusions can be drawn about the thickness profile of the melt and the right-hand and left-hand edge region of the melt is monitored by means of the sensor and is controlled or regulated in such a way that the respective edge region is set by adjusting the adjusting elements 20 depending on the material, in particular viscosity and/or viscoelasticity, and/or quality criteria and/or a conveying speed. This has the advantage that the edge region of the melt or film which is outside the net region is explicitly considered and evaluated. By monitoring the edge region of the melt, the entire thickness profile can be optimally set. The edge region can be evaluated with regard to quality and/or stability criteria, in particular depending on the product to be produced and/or the production process.

At the initial operation of the nozzle assembly 10 for conveying the melt, the adjusting elements 20 can be uniquely set free from play for a subsequent regulation of the slot size of the nozzle discharge slot 16 as the initial setting. This has the advantage that an exact alignment of the nozzle discharge slot 16 is possible. If there is too much play in the adjusting elements 20, the heating or cooling of the thermoelements 30 cannot partially lead to a deformation of the nozzle lip 12. In addition, the setting of the adjusting elements 20 free from play allows a reproducible starting point of the nozzle regulation at the initial operation of the nozzle assembly 10. This generally increases the process stability. In particular, the setting free from play can be carried out automatically at the initial operation of the nozzle assembly 10, thus avoiding any manual intervention by an operator.

For example, at least two adjusting elements 20 can be adjusted simultaneously. This has the advantage that the simultaneous, in particular automatic, adjustment of at least two adjusting elements 20 eliminates the need for a time-consuming manual adjustment of individual adjusting elements one after the other. Likewise, the simultaneous adjustment of two adjusting elements 20, in particular of two adjacent adjusting elements 20, can reduce the transverse influence of the adjusting elements 20.

Furthermore, at least one clamping blade, not shown, can be arranged in a respective right-hand and left-hand edge region of the nozzle assembly 10, wherein the width of the nozzle discharge slot 16 can be variably set, wherein a method for adjusting the width of the nozzle discharge slot 16 and for clamping the adjusting elements 20 can be carried out automatically and comprises the following steps:

unclamping the clamping blade within the nozzle discharge slot 16;
displacing the clamping blade within the nozzle discharge slot 16;
clamping the clamping blade within the nozzle discharge slot 16 for fixing individual adjusting elements 20.

This has the advantage that the automatic setting of the clamping blades for a width adjustment of the nozzle discharge slot 16 results in significant time savings in the production process, as no manual adjustment by the operator is required.

Figure 2:
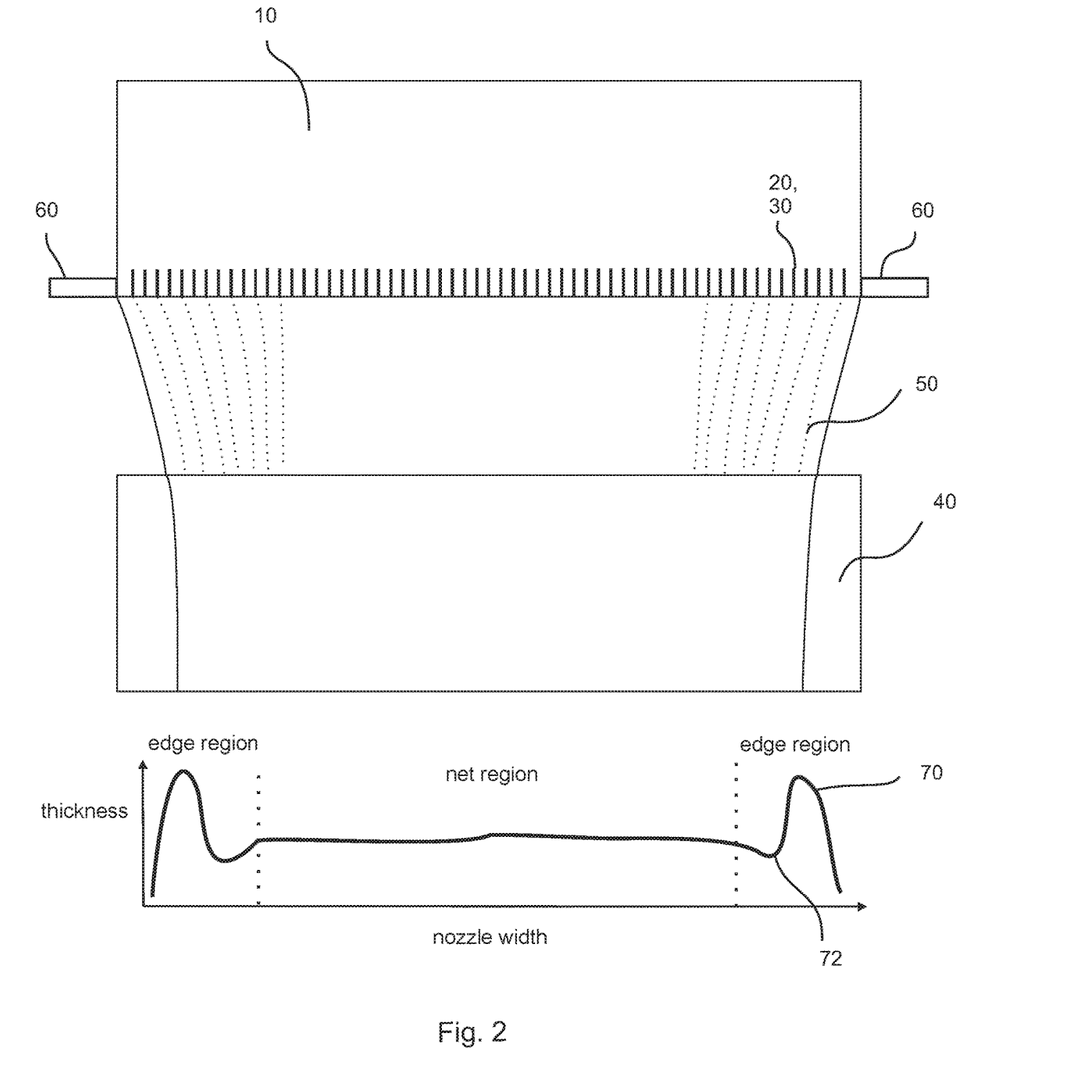
FIG. 2 a schematic view of an inventive nozzle assembly according to a further embodiment with a characteristic thickness profile.

FIG. 2 shows a schematic view of a nozzle assembly according to the invention for the automated regulation of the size of a nozzle discharge slot according to a further exemplary embodiment with a characteristic thickness profile. The nozzle assembly 10 comprises a non-shown first nozzle lip 12 and a non-shown second nozzle lip 14. A nozzle discharge slot 16 is arranged between the nozzle lips 12, 14 for the controlled setting of a thickness profile of a conveyable melt 50. The melt 50, for example a plastic melt for the production of a flat film, is conveyed through the nozzle discharge slot 16. Depending on the size or height of the nozzle discharge slot 16, the thickness of the melt 50 is set or changed.

For setting the size or height of the nozzle discharge slot 16, a plurality of adjusting elements 20, in particular approx. 120 adjusting elements 20, is arranged on the first nozzle lip 12. Each adjusting element 20 is coupled with a respective thermoelement 30. When heated, the thermoelement 30 expands and exerts a mechanical pressure on the first nozzle lip 12 via the respective adjusting element 20, causing it to deform at the corresponding location. In particular, the nozzle discharge slot 16 is reduced. Furthermore, the thermoelement 30 can compress during cooling and causes a mechanical pull on the first nozzle lip 12 via the adjusting element 20, which increases the nozzle discharge slot 16 at the corresponding location. For this purpose, the thermoelement 30 can be controlled by a nozzle regulation in such a way that the slot can be adjusted by the action of a mechanical force from the adjusting element 20 on the first nozzle lip 12, as a result of the expansion or contraction of the thermoelement 30.

The outgoing melt 50 conveyed through the nozzle discharge slot 16 is adhered to a casting roll 40 by means of electrostatics in an exemplary manner and can then be wound into a sleeve in a subsequent winding device. Due to the adhesion the melt 50 can be fixed to the casting roll 40. The edge of the melt 50 is characterized by the so-called edge entry ("neck-in"), which is caused by the withdrawal of the melt 50 from the nozzle assembly 10 and the viscoelastic behavior of the melt 50. As a result of the neck-in, a reduction of the film width at the casting roll 40 in relation to the width of the nozzle discharge slot 16, as well as a thickening 70 of the edge region of the film corresponding to this reduction, occurs. The reduction of the film width is represented by the curved dotted lines at the melt 50. The thickening 70 is further exemplarily illustrated by the characteristic thickness profile of the melt 50.

The y-axis shows the thickness of the melt 50 and the X-axis shows the nozzle width. The thickness of the melt 50 is regulated in such a way that a constant thickness can be optimally achieved along the entire nozzle width. The characterizing thickening 70 of the right-hand and left-hand edge region of the nozzle assembly 10 is caused by the neck-in of the melt 50. Due to the electrostatic edge adhesion to the casting roll 40, a thin section 72 can occur between the thickening 70 and a constant thickness of the melt 50, since the electrostatics attract melt particles from both sides. The characteristics of the thin section 72 depends, for example, on the melt flow distribution at the nozzle discharge slot 16, on the viscoelastic behavior of the melt 50 and on process settings such as the line speed, the length of the melt plume, or the strength of the edge adhesion.

The thickness profile of the melt 50 is monitored by a sensor, not shown here, as an example. The sensor can be designed as an optical sensor and/or arranged on the casting roll 40, so that conclusions can be drawn about the thickness profile of the melt 50. For this purpose, the sensor is preferably connected to the regulation via data communication for the transmission of measurement signals.

By comparing the measured thickness profile with a nominal value, a basic control value can be generated by the regulation for the individual adjusting elements 20 so that a deviation from the nominal value is a maximum of 30%, in particular a maximum of 10%, preferably in the range of 2% to 5%. In other words, the regulation can be used to set an essentially constant thickness of the melt 50. For this purpose, the regulation comprises a data processing unit, which is configured in such a way that the measurement signals of the sensor are processed and, based on this, a control signal is generated for the adjusting elements 20 or the respective thermoelements 30 for adjusting the slot of the nozzle discharge slot 16. In other words, the processing of the measurement signals of the sensor results in the automatic control or regulation of individual, several or all adjusting elements 20 of the nozzle assembly.

For example, at least two adjusting elements 20 can be adjusted simultaneously. This has the advantage that the simultaneous, in particular automatic, adjustment of at least two adjusting elements 20 eliminates the need for a time-consuming manual adjustment of individual adjusting elements one after the other. Likewise, the simultaneous adjustment of two adjusting elements 20, in particular of two adjacent adjusting elements 20, can reduce the transverse influence of the adjusting elements 20.

At the initial operation of the nozzle assembly 10 for conveying the melt 50, the adjusting elements 20 can be set uniquely free from play for a subsequent regulation of the slot size of the nozzle discharge slot 16 as the initial setting. This has the advantage that an exact alignment of the nozzle discharge slot 16 is possible. In particular, the setting free from play can be carried out automatically at the initial operation of the nozzle assembly 10, thus avoiding any manual intervention by an operator.

Furthermore, the right-hand and left-hand edge region of the melt 50 can be monitored by means of the sensor and controlled or regulated in such a way that the respective edge region is set by adjusting the adjusting elements 20 depending on the material, in particular viscosity and/or viscoelasticity, and/or quality criteria and/or a conveying speed. This has the advantage that the edge region of the melt 50, which is outside the net region, is explicitly considered and evaluated. By monitoring the edge region of the melt 50, the entire thickness profile can be optimally set. The edge region can be evaluated with regard to quality and/or stability criteria, in particular depending on the product to be produced and/or the production process.

Furthermore, at least one clamping blade 60 is arranged in a respective right-hand and left-hand edge region of the nozzle assembly 10, wherein the width of the nozzle discharge slot 16 can be variably set, wherein a method for adjusting the width of the nozzle discharge slot 16 and for clamping the adjusting elements 20 can be carried out automatically and comprises the following steps;
- unclamping the clamping blade 60 within the nozzle discharge slot 16;
- displacing the clamping blade 60 within the nozzle discharge slot 16;
- clamping the clamping blade 60 within the nozzle discharge slot 16 for fixing individual adjusting elements 20.

This has the advantage that the automatic setting of the clamping blades 60 for a width adjustment of the nozzle discharge slot 16 results in significant time savings in the production process, as no manual adjustment by the operator is required. Clamping and/or unclamping of the clamping blades 60 is done thermally in an exemplary manner. The displacement of the respective clamping blade 60 can be motorized and limited to a maximum adjustment torque.

Figure 3:
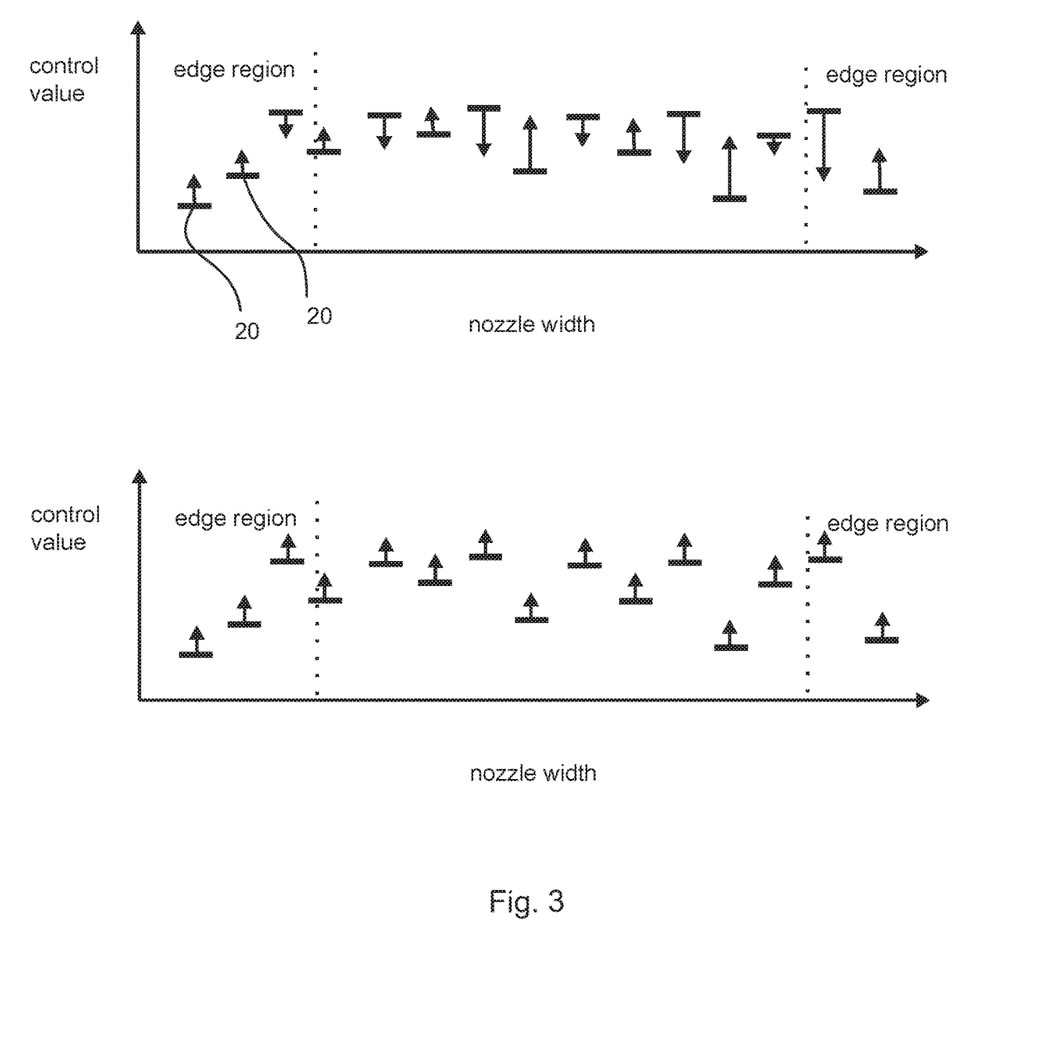
FIG. 3 each a schematic diagram of a regulation according to the invention with a simultaneous and parallel adjustment of the adjusting elements.

FIG. 3 shows a schematic diagram of an inventive regulation of the size of a nozzle discharge slot of a nozzle assembly with a simultaneous and parallel adjustment of the adjusting elements. The description of the nozzle assembly 10 is analogous to FIG. 2.

In both diagrams, the y-axis shows the control value for the individual adjusting elements 20 and the x-axis shows the nozzle width. The individual adjusting elements 20 are represented by a horizontal line. Thus, there are several adjusting elements 20 at a defined distance from each other along the nozzle width. The direction of the arrows shows the adjustment of the adjusting elements 20. An upward adjustment implies a contraction of the thermoelement 30 associated with the adjusting element 20, which causes a mechanical pull via the adjusting element 20 and increases the nozzle discharge slot 16 at the corresponding location. A downward adjustment implies an expansion of the thermoelement 30 associated with the adjusting element 20, which causes a mechanical pressure via the adjusting element 20 and reduces the nozzle discharge slot 16 at the corresponding location. The length of the individual arrows of the adjusting elements 20 describes the size of the control value or the amount of the strength of the adjustment.

In the diagram above, the regulation effects a simultaneous adjustment of all adjusting elements 20. All adjusting elements 20 are adjusted along the entire nozzle width, in particular also in the right-hand and left-hand edge region. The size of the adjustment is based on the measured thickness profile of the melt 50. To compensate the thickness profile in case of deviations from a constant thickness, in particular in the net region of the melt 50, the adjusting elements 20 are adjusted upwards and downwards.

In the diagram below, the regulation effects a simultaneous and parallel adjustment of all adjusting elements 20. All adjusting elements 20 are adjusted symmetrically along the entire nozzle width, in particular also in the right-hand and left-hand edge regions. The adjusting elements 20 are adjusted over an equal stroke to increase the nozzle discharge slot 16. In general, the adjustment of the adjusting elements can occur depending on the type of melt and/or depending on the size of a basic slot of the nozzle assembly 10.

Figure 4:
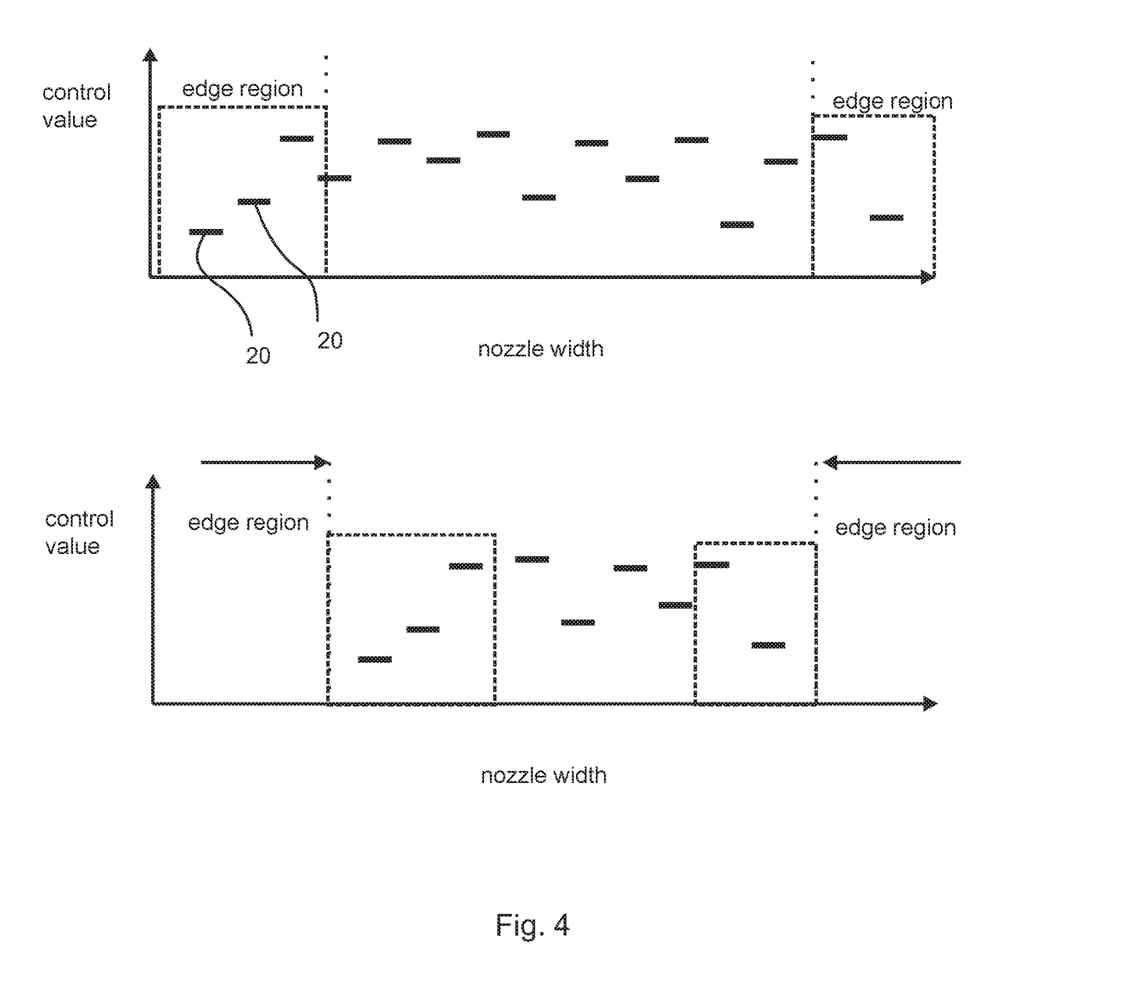
FIG. 4 each a schematic diagram of a regulation according to the invention for the transfer of the setting of the adjusting elements in an edge region.

FIG. 4 shows in each case a schematic diagram of an inventive regulation of the size of a nozzle discharge slot of a nozzle assembly for the transmission of the setting of the adjusting elements in an edge region. The description of the nozzle assembly 10 is analogous to FIG. 2.

In both diagrams, the y-axis shows the control value for the individual adjusting elements 20 and the x-axis shows the nozzle width. The individual adjusting elements 20 are represented by a horizontal line. Thus, there are several adjusting elements 20 at a defined distance from each other along the nozzle width.

The diagram above shows an example of a specific setting of the adjusting elements 20 for the entire nozzle width. This specific setting can occur depending on the material of the melt, in particular its viscosity and/or viscoelasticity, and/or quality criteria and/or the conveying speed.

In the diagram below, the specific setting of the adjusting elements 20 in the respective edge region is transferred as an example from the upper diagram to a reduced nozzle discharge slot or a reduced nozzle width. The reduction of the nozzle width is shown by means of the arrows and realized by means of the clamping blades 60. Before displacing the clamping blades 60, an examination can occur to determine whether the specific setting needs to be adapted.

The above explanation of the embodiment describes the present invention exclusively in the context of examples. Of course, individual features of the embodiment can be freely combined with each other, if technically reasonable, without leaving the scope of the present invention.

LIST OF REFERENCE SIGNS 10 nozzle assembly
12 first nozzle lip
14 second nozzle lip
16 nozzle discharge slot
20 adjusting element
30 thermoelement
40 casting roll
50 melt
60 clamping blade
70 thickening
72 thin section

The invention claimed is:

1. A method for automatically regulating the size of a nozzle discharge slot of a nozzle assembly, wherein the nozzle assembly comprises a first and a second nozzle lip and a nozzle discharge slot arranged between the nozzle lips for setting in a controlled manner a thickness profile of a conveyable melt, wherein a plurality of adjusting elements is arranged at the first nozzle lip, which are coupled to a respective thermoelement, wherein the thermoelements are controllable by the regulation in such a way that the slot adjustment can be realized by the action of a mechanical force from the respective adjusting element on the first nozzle lip as a result of an expansion or contraction of the thermoelements, wherein an adjustment of the adjusting elements is carried out automatically based on measurement signals of at least one sensor, wherein the sensor is at least designed or arranged at the nozzle assembly in such a way that conclusions can be drawn about the thickness profile of the melt,
wherein
the right-hand and left-hand edge region of the melt is monitored by means of the sensor and is controlled or regulated in such a way that the respective edge region is set by adjusting the adjusting elements depending on the viscosity and/or viscoelasticity of the material, a quality criteria and a conveying speed.

2. The method according to claim 1,
wherein
individual adjusting elements are adjusted with a time delay.

3. The method according to claim 1,
wherein
the adjusting elements are adjusted simultaneously.

4. The method according to claim 1,
wherein
the adjusting elements are adjusted over an equal stroke, thus enabling a parallel adjustment.

5. The method according to claim 1,
wherein
a simultaneous adjustment of individual or several adjusting elements occurs.

6. The method according to claim 1,
wherein
by means of at least electrostatics or air an edge adhesion of the melt emerging from the nozzle assembly to a casting roll occurs, wherein the edge adhesion is set by means of the regulation depending on at least the material or quality criteria or the conveying speed.

7. The method according to claim 6,
wherein
the edge adhesion is continuously at least monitored or detected during the operation of the nozzle assembly.

8. The method according to claim 7,
wherein
the edge adhesion is detected by means of at least a multidimensional motorized traversing or an optical system or a temperature detection of the melt on the casting roll or sensors to determine the thickness profile of the melt.

9. The method according to claim 1,
wherein
the specific setting of the adjusting elements depending on the viscosity and/or viscoelasticity of the material, the quality criteria and the conveying speed is stored or integrated as a self-learning algorithm for a renewed initial operation of the nozzle assembly.

10. The method according to claim 1,
wherein
at an initial operation of the nozzle assembly for conveying the melt, the adjusting elements for subsequent regulation of the slot size are set uniquely free from play as the initial setting.

11. The method according to claim 1,
wherein
at least two adjusting elements are adjusted simultaneously.

12. The method according to claim 1,
wherein
at least one clamping blade is respectively arranged in a right-hand and left-hand edge region of the nozzle assembly, wherein the width of the nozzle discharge slot can be variably set, wherein the method comprises the following steps, which are carried out automatically for adjusting the width of the nozzle discharge slot and for clamping the adjusting elements:
unclamping the clamping blade within the nozzle discharge slot;
displacing the clamping blade within the nozzle discharge slot; and
clamping the clamping blade within the nozzle discharge slot for fixing individual adjusting elements.

13. At least a control or regulation system with a control unit for carrying out the method according to claim 1.

* * * * *